United States Patent
Rohdin et al.

(10) Patent No.: US 9,729,255 B1
(45) Date of Patent: Aug. 8, 2017

(54) METHOD OF CALIBRATING ELECTRONIC DEVICE FOR OPTIMIZED OVERALL SPECIFICATION-DRIVEN PERFORMANCE USING STIMULI WITHIN NORMAL OPERATION RANGES OF THE ELECTRONIC DEVICE

(71) Applicant: Avago Technologies General IP (Singapore) Pte. Ltd., Singapore (SG)

(72) Inventors: Hans G. Rohdin, Los Altos, CA (US); Bartholomeus H. Jansen, San Jose, CA (US); John Stephen Kofol, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/166,698

(22) Filed: May 27, 2016

(51) Int. Cl.
| | |
|---|---|
| *H04K 1/02* | (2006.01) |
| *H04L 25/03* | (2006.01) |
| *H04L 25/49* | (2006.01) |
| *H04B 17/21* | (2015.01) |
| *H04B 17/29* | (2015.01) |

(52) U.S. Cl.
CPC ............. *H04B 17/21* (2015.01); *H04B 17/29* (2015.01)

(58) Field of Classification Search
CPC ...... H04B 17/21; H04B 17/29; H04B 1/0458; H04B 15/04; H04L 27/361
USPC ................ 375/296, 297, 224, 228, 344, 345
See application file for complete search history.

(56) References Cited

U.S. PATENT DOCUMENTS

| | | | |
|---|---|---|---|
| 2006/0132339 A1* | 6/2006 | Alon ................... | H03M 1/1023 341/120 |
| 2007/0194776 A1 | 8/2007 | Bossche | |
| 2011/0086600 A1* | 4/2011 | Muhammad ......... | H04B 1/0458 455/120 |
| 2012/0274370 A1* | 11/2012 | Fortier .................... | H03L 7/099 327/156 |
| 2013/0029626 A1* | 1/2013 | Chen ...................... | H04B 15/04 455/334 |
| 2014/0125410 A1* | 5/2014 | Pamarti ................. | H03F 1/0205 330/149 |

(Continued)

FOREIGN PATENT DOCUMENTS

WO    01/27648 A1    4/2001

*Primary Examiner* — Phuong Phu (57) ABSTRACT

A method is provided for calibrating a device under calibration (DUC) for optimizing performance of the DUC. The method includes receiving stimulus signal characteristics of a stimulus signal to be generated by the signal generator, including modulation type and duty cycle, where the stimulus signal characteristics are within a normal operating range of the DUC; receiving average output power set points and RF carrier frequencies of a DUC output signal; outputting the stimulus signal characteristics to a signal generator for generating the stimulus signal; iteratively performing an optimization process, using DUC calibration parameters that are simultaneously adjusted between consecutive iterations of the optimization process, to determine corresponding error functions based on measured power supply currents, output powers and linearities of the DUC output signal for the consecutive iterations, respectively, until a difference between consecutive error function values reaches a specified minimum; and using values of the calibration parameters corresponding to a last iteration.

19 Claims, 4 Drawing Sheets

(56) References Cited

U.S. PATENT DOCUMENTS

2015/0139360 A1\* 5/2015 Visser ............... H04L 27/361
                                                    375/298
2016/0072594 A1  3/2016 Yuan et al.

\* cited by examiner

METHOD OF CALIBRATING ELECTRONIC DEVICE FOR OPTIMIZED OVERALL SPECIFICATION-DRIVEN PERFORMANCE USING STIMULI WITHIN NORMAL OPERATION RANGES OF THE ELECTRONIC DEVICE

BACKGROUND

Envelope tracking (ET) and digital predistortion (DPD) coefficients of an electronic device being calibrated, referred to as a device under calibration (DUC), are determined using a calibration process referred to as "ET calibration." An example of a typical DUC is a power amplifier (PA) circuit, which includes a PA having a non-linear response to an input stimulus signal. Conventional ET calibration methods include a test bench method, according to which output signals of the DUC are measured in response to application of high-power continuous wave (CW) signals over extended periods of time, a situation not representative of normal product use, and not in line with how the product is best optimized in computer-aided design.

The test bench method is based on simplistic views of an envelope tracking PA (ETPA), for example, and do not result in calibration of the ETPA circuit that produces optimum overall performance. Generally, there are two sets of issues in optimizing calibration of an ETPA circuit (i.e., the DUC). First, it is assumed that an optimized ETPA circuit should have a bias shaping function (SF) based on power gain. With phase-only DPD, it is assumed that this power gain should be constant to minimize distortion. With full amplitude and phase DPD, a constant gain compression (e.g., 2-5 dB) thought to be associated with best efficiency is often used. SF coefficients are often determined based on mid-band power gain. Such approaches lead only to initial guesses for an optimum SF. Gain is not constant across the band, so a midband-based choice does not necessarily produce the best compromise. A constant level of compression is not fundamentally optimum, and the necessary tradeoffs to meet other specifications are not addressed. ET and DPD provide relief in the classical tradeoff of efficiency for linearity, but other tradeoff quantities remain, such as gain; and a new key one is introduced: the power and modulation-bandwidth dependent efficiency of the ET bias modulator (ETBM).

Second, in order to determine the SF coefficients during calibration, high-power CW signals are applied to the ETPA circuit, including at high powers, over a period of time much longer than the ETPA circuit would experience in the field. This extended application of high power CW signals may result in damage to sensitive components of the ETPA circuit. At the time of calibration, the DUC has been invested with nearly all of the value added by manufacture. Therefore, damage caused by calibration is especially costly, be it due to yield loss in a final screening test or in increased number of field returns.

Accordingly, what is needed is a method to determine optimized calibration parameter values of a DUC without applying potentially damaging high-power CW signals over extended periods of time while also avoiding the overly-restrictive constraints that conventional methods commonly employ. The illustrative embodiments of the disclosure provide methods that address these needs with an approach proven in the DUC design phase.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements throughout the drawings and written description.

DETAILED DESCRIPTION

In the following detailed description, for purposes of explanation and not limitation, example embodiments disclosing specific details are set forth in order to provide a thorough understanding of the present teachings. However, it will be apparent to one of ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a", "an" and "the" include both singular and plural referents, unless the context clearly dictates otherwise. Thus, for example, "a device" or "a component" includes one device and plural devices or components. The terms "substantial" or "substantially" mean to within acceptable limits or degree, and the term "approximately" means to within an acceptable limit or amount, to one of ordinary skill in the art. Relative terms, such as "above," "below," "top," "bottom," "upper" and "lower" may be used to describe the various elements" relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element. Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

According to various embodiments, a method is provided for calibrating and/or designing an electronic device, hereinafter referred to as a device under calibration (DUC). The embodiments optimize performance and/or design of the DUC, exceeding results of conventional methods, with respect to a number of features, including using stimuli representative of normal product use and in line with how the DUC is best optimized in computer-aided design (e.g., no CW signals, excessive powers or excessive lengths of time), addressing all key specifications of the DUC simultaneously, and making no a priori assumptions of what DUC behavior is optimum.

The method according to various embodiments is described for use in calibration of a DUC, although various embodiments may also be used for simulation and optimization design of the DUC, from which the calibration method has been adapted. The simulation and optimization include replacing measurements made on the DUC at calibration time with computer simulations of DUC behavior at design time. When used in the design phase, the method finds optimized values of the hardware components of the DUC. In addition, the method finds optimized values of the calibration factors as a byproduct. The method has proven highly effective at producing optimized designs in significantly shorter time than is typical using conventional methods.

In a representative embodiment, a method is provided for calibrating a DUC using a calibration system for optimizing performance of the DUC, the calibration system comprising a power supply, a signal generator, a baseband gain adjuster, a voltage/current (V/I) bias generator and a signal analyzer, as discussed below. The method includes receiving stimulus signal characteristics of a stimulus signal to be generated by the signal generator and provided to the DUC, the stimulus signal characteristics including modulation type and duty cycle of the stimulus signal, for example, where the stimulus signal characteristics appearing with appropriate amplitude (i.e. after appropriate gain adjustment) at an input of a power amplifier in the DUC are within a normal operating range of the DUC to avoid damaging the DUC due to stress caused by stimulus signal characteristics outside the normal operating range and otherwise not representative of operational requirements of the DUC; receiving average output power set points and at least one RF carrier frequency of an output signal of the DUC, the output signal being responsive to the stimulus signal; outputting the stimulus signal characteristics to the signal generator for generating the stimulus signal according to the stimulus signal characteristics; iteratively performing an optimization process, using calibration parameters of the DUC that are simultaneously adjusted between consecutive iterations of the optimization process, to determine corresponding error functions based on measured power supply currents, output powers and/or linearities of the output signal of the DUC for the consecutive iterations, respectively, until a difference between consecutive determined error function values reaches a specified minimum; and using values of the calibration parameters corresponding to a last iteration of the optimization process for operating the DUC.

Figure 1:
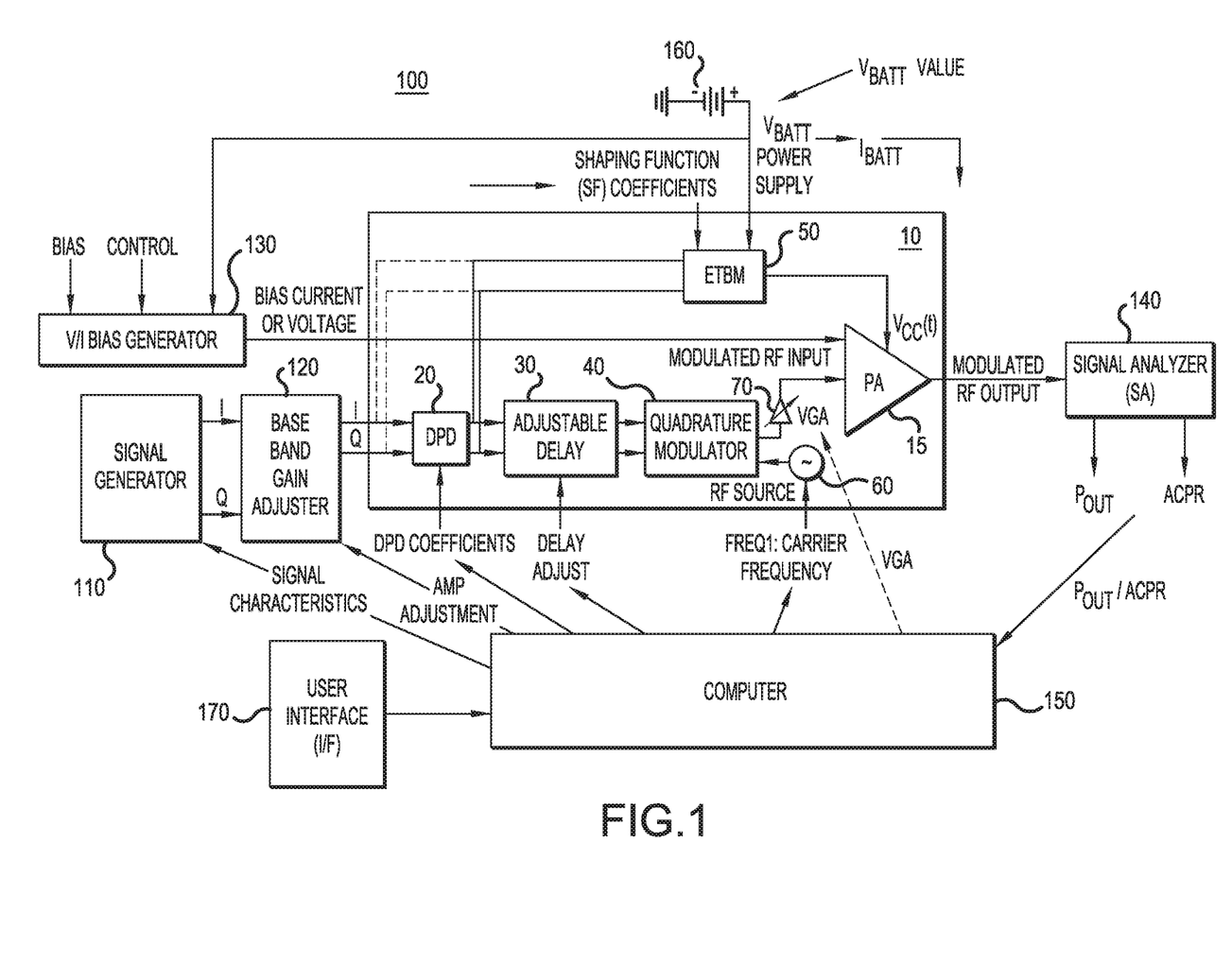
FIG. 1 is a simplified block diagram of a calibration system for optimizing performance of a device under calibration (DUC), according to a representative embodiment.

FIG. 1 is a simplified block diagram of a calibration system for optimizing performance of a device under calibration (DUC), according to a representative embodiment. Calibrating the DUC generally includes optimizing (e.g., minimizing) an overall error function (EF) of the DUC, using an EF algorithm, by changing calibration parameters in response to application of different powers, modulation signals and frequencies, and measuring at least the resulting radio frequency (RF) output power, linearity and DC current (or power) consumption of the DUC.

Referring to FIG. 1, calibration system 100 includes various components to enable calibration of an illustrative DUC 10. In the depicted embodiment, the calibration system 100 includes a signal generator 110 configured to output a stimulus signal (i.e., baseband I and Q signals), and a baseband gain adjuster 120 connected to an output of the signal generator 110 and configured to provide an amplified (or otherwise amplitude adjusted) stimulus signal (i.e., baseband I' and Q' signals) as an input to the DUC 10. In an embodiment, the baseband gain adjuster 120 may not be included, in which case the stimulus signal generated and output by the signal generator 110 is input directly to the DUC 10. The calibration system 100 further includes a voltage/current (V/I) bias generator 130, a signal analyzer 140, a computer 150, and a power supply 160.

In the depicted example, the DUC 10 is a power amplifier circuit, such as an ETPA circuit, that includes a power amplifier 15, although other types of DUCs, particularly those with non-linear responses to stimulus signals, may be calibrated and/or designed using the calibration system 100. In addition to the power amplifier 15, the DUC 10 includes additional components that may be involved in the calibration process, such as a digital pre-distortion (DPD) circuit 20, an adjustable delay circuit 30, a quadrature modulator 40, an envelope tracking bias modulator (ETBM) 50, and an RF source 60. The DUC 10 may also include a variable gain amplifier (VGA) 70 for adjusting an RF input signal provided to the power amplifier 15, as discussed below. However, the RF input signal may be adjusted by alternative means internal to the DUC 10, and/or may be adjusted by external means, such as by the baseband gain adjuster 120 of calibration system 100, without departing from the scope of the present teachings.

The signal generator 110 may be a baseband data steam generator, for example, which outputs an initial quadrature baseband signal I/Q as the stimulus signal. The stimulus signal may be gain-adjusted by the baseband gain adjuster 120, to provide the amplified quadrature baseband signal I'/Q', which may be referred to as the amplified stimulus signal, that is input to the DUC 10. The stimulus signal may be a quadrature amplitude modulated (QAM) baseband signal or a quadrature phase shift keying (QPSK) modulated baseband signal, for example. The stimulus signal is processed to ultimately become a quadrature modulated RF input signal input to the PA 15 within the DUC 10. In an embodiment, the stimulus signal generated by the signal generator 110 is a digital signal that is ultimately converted to an analog signal by a digital-to-analog converter (DAC) (not shown) before quadrature modulation, e.g., by the quadrature modulator 40. In alternative embodiments, the signal generator 110 may generate analog stimulus signals, eliminating the need for the digital-to-analog conversion.

More particularly, the baseband gain adjuster 120 receives the initial stimulus signal from the signal generator 110, and adjusts the amplitude (gain) in accordance with an amplitude adjustment parameter received from the computer 150, as discussed below, to provide an amplitude adjusted stimulus signal input to the DUC 10. In an embodiment, characteristics of the stimulus signal are provided to the signal generator 110 by the computer 150, including modulation type and duty cycle of the stimulus signal.

Unlike conventional calibration systems, which use high power CW signals over extended periods of time, for example, the stimulus signal characteristics of the stimulus signal according to the various embodiments of the present disclosure are within a normal operating range of the DUC 10. Accordingly, the DUC 10 is not exposed to stimulus signals having characteristics that are unrepresentative of those the DUC 10 would most likely encounter in operation and/or for periods of time longer than the DUC 10 would most likely encounter, which may cause potentially damaging stress to the DUC 10 during calibration. For example, the stimulus signal is not a single high-power CW signal, as used in conventional methods, but has the distribution of powers characteristic of the stimulus signal chosen. The stimulus signal characteristics may be input to the computer 150 by a user via the user I/F 170, such as a keyboard, a mouse, a touch pad, or a touch screen, for example.

In alternative embodiments, the amplitude of the initial stimulus signal may be adjusted by means other than the baseband gain adjuster 120. For example, as mentioned above, when the DUC 10 includes the VGA 70, the initial stimulus signal may be input directly to the DUC 10 (without amplification), and ultimately modulate the carrier signal from the RF source 60 at the quadrature modulator 40. The amplitude of the resulting modulated RF signal may then be adjusted by the VGA 70, without departing from the scope of the present teachings, providing the modulated RF input signal to the PA 15.

The V/I bias generator 130 is configured to generate bias currents and/or bias voltages to be applied to the PA 15. The V/I bias generator 130 is powered by the power supply 160, although a power supply separate from the power supply 160 may be used for the V/I bias generator 130, without departing from the scope of the present teachings. The V/I bias generator 130 may include sourcing of other signals, such as control signals, mode signals and/or reference signals (a representative control signal is depicted in FIG. 1 simply for purposes of illustration), that may be required by the DUC 10. For example, as discussed below, EF is computed from a set of measurements made using different powers, modulation signals and frequencies. However, a DUC will likely include control signal inputs (which are not optimized during calibration) that cause various operating behaviors (i.e., modes) of the DUC to change. Calibration measurements described herein would have to be made for each of one or more modes set by the control signals, including its own set of average power set points, RF carrier frequencies, modulation signals, and the like. Thus, an overall EF for the DUC 10 (assuming the DUC 10 has multiple control settings and/or modes) would be computed that ranges over the control settings and/or modes, in addition to the other variations described below with reference to FIG. 2.

The values of various signals sourced by the V/I bias generator 130 (e.g., the bias signals) generally fall into two categories: 1) signals having values that are determined by the user, and 2) signals having initial values determined by the user, then altered as part of the calibration process. The V/I bias generator 130 is controlled by bias control signals from the computer 150, which receives the user inputs via the user I/F 170, as discussed below. Supply-sourcing has relevance to any discussion of measurement of efficiency, such as power added efficiency (PAE) measurement of the output signal of DUC 10.

The signal analyzer 140 may be implemented using known signal analyzers, such as an N9020A MXA Signal Analyzer, available from Keysight Technologies, for example, capable of processing the output signals of the DUC 10. For example, the signal analyzer 140 receives the output signals of the DUC 10 responsive to the stimulus signal initially generated by the signal generator 110. The signal analyzer 140 is configured to measure the output power $P_{OUT}$ and the linearity of the output signals of the DUC 10. The power supply currents $I_{BATT}$ provided by the power supply 160 to the DUC 10 may be measured by a current meter (not shown). Measuring the linearity, in particular, may include measuring adjacent channel power ratio (ACPR) and/or measuring other spectral re-growth power ratios of the output signals of the DUC 10.

As discussed below, the power supply current, the output power $P_{OUT}$ and the linearity are measured for each average output power set point of multiple average output power set points at one or more RF carrier frequencies (the RF carrier signals with these frequencies being generated by the RF source 60) per average power set point, where the average output power set points at the one or more RF carrier frequencies of the carrier signals may be determined by the user. The signal analyzer 140 provides the measured output power $P_{OUT}$ and linearity (indicated as ACPR in FIG. 1, for purposes of illustration) of the DUC output signal for each average output power set point at the various RF carrier frequencies, and the current meter (not shown) measures the power supply current $I_{BATT}$, which measurements are provided to the computer 150.

The computer 150 may be implemented as a computer processor, e.g., in a personal computer (PC), a laptop computer, a dedicated workstation, or other computing device, application specific integrated circuits (ASICs), field-programmable gate arrays (FPGAs), or combinations thereof, using software, firmware, hard-wired logic circuits, or combinations thereof. That is, the computer 150 and/or computer processor may be constructed of any combination of hardware, firmware or software architectures, and may include non-transitory memory (e.g., volatile and/or nonvolatile memory) for storing executable software/firmware executable code or instructions of a computer program that enables performance the various functions, such as the steps described below with reference to FIG. 2, for example. In an embodiment, the computer 150 may comprise a central processing unit (CPU), for example, executing an operating system. The computer 150 may also include a storage device, such as random access memory (RAM), read-only memory (ROM), flash memory, electrically programmable ROM (EPROM), electrically erasable programmable ROM (EEPROM), hard disk drive (HDD), or other non-transitory memory. Data from various inputs and measurements described herein may be stored in the memory for subsequent use and analysis, and/or displayed on a display (not shown), for example. The user I/F 170 may be included with the computer 150 for the user to provide calibration input, parameters and other information, control operations and/or view data and computation results of the calibration system 100 via the display. The user I/F may include any compatible computer interface, such as a graphical user interface (GUI), a keyboard, a mouse, a touch pad, or a touch screen, for example.

As mentioned above, the DUC 10 includes additional components that may be involved in the calibration process. In the depicted embodiment, the DUC 10 receives the stimulus signal (quadrature signal I/Q) from the baseband gain adjuster 120, and the received stimulus signal is input to the DPD circuit 20 and the ETBM 50. The DPD circuit 20 is configured to receive DPD coefficients from the computer 150, and to pre-distort the stimulus signal using the DPD coefficients in order to undo the distortion, as much as possible, that will be introduced by the PA 15. In an embodiment, the DPD circuit 20 outputs the pre-distorted stimulus signal to the ETBM 50 and to the adjustable delay circuit 30. In an alternative embodiment, the DPD circuit 20 outputs the pre-distorted stimulus signal to the adjustable delay circuit 30, while the ETBM 50 is fed the stimulus signal prior to the DPD circuit 20 (indicated by dashed lines). The adjustable delay circuit 30 is configured to receive the amount of delay adjustment from the computer 150, and to adjust the delay of the pre-distorted stimulus signal, typically present in the DUC 10, accordingly. The purpose of adjusting the delay of the pre-distorted stimulus signal is to synchronize as much as possible the dynamic $V_{CC}(t)$ with the amplitude of the modulated RF input to the PA The adjustable delay circuit 30 outputs the delay-adjusted, pre-distorted stimulus signal to the quadrature modulator 40, which quadrature modulates (e.g., QAM) the RF carrier signal (provided by the RF source 60) with the delay-adjusted, pre-distorted stimulus signal. That is, the quadrature modulator 40 receives the baseband I' and Q' signals, which it uses to amplitude modulate a pair of quadrature sinusoids at the RF carrier frequencies, and then sums the amplitude modulated pair of quadrature sinusoids to provide the quadrature modulated RF input signals. The values of the RF carrier frequencies may be provided by the user via the user I/F 170, along with average output power set points for calibrating the DUC 10. The average output power set points may be determined, for example, by the user based on the useful range of the ETBM 50, and the one or more RF carrier frequencies may be determined, for example, by the user based on the communication band (e.g., Long-Term Evolution (LTE) frequency bands) to be used.

Meanwhile, the ETBM 50, which is powered by the power supply 160, receives the amplified stimulus signal from the baseband gain adjuster 120 or the pre-distorted stimulus signal from the DPD circuit 20. The ETBM 50 may be referred to as the "envelope tracker." The ETBM 50 also receives envelope tracker shaping function (SF) coefficients from the computer 150, where the SF coefficients are values that enable adjustment of a predetermined EF algorithm, discussed below. The output of the ETBM, indicated as Vcc(t), is some function of the I+j*Q magnitude sqrt($I^2+Q^2$). The envelope tracker shaping function (SF) thus is understood to mean the function or formula by which the ETBM 50 creates Vcc(t) from the stimulus signal. Vcc(t) is input to the PA 15 as the PA power supply voltage.

As discussed above, the RF source 60 generates carrier signals for the quadrature modulated RF input signal output by the quadrature modulator 40 and provided to the PA 15. In the depicted embodiment, the output of the quadrature modulator 40 may be gain adjusted by the VGA 70, where the magnitude of the gain adjustment (if any) is controlled by a VGA gain parameter provided by the computer 150. This enables control of the amplitude of the modulated RF input signal into the PA 15. The value that is ultimately used for the gain (after achieving the EF value goal) would typically become one of the calibration parameters that are being determined by the calibration method.

As mentioned above, another way to adjust the gain is through the baseband gain adjuster 120 pursuant to the amplitude adjustment parameter from the computer 150. In the baseband gain adjuster 120, the baseband signals I and Q may take the form of digital data streams. When the gain is adjusted through the baseband gain adjuster 120, the adjustment is commonly done in the digital domain using numerical multiplication, where the value of the gain is expressed simply as a digital number. Of course, whether the gain is adjusted using the baseband gain adjuster 120 or the VGA 70, or a combination of the two, depends in part on whether the particular DUC 10 includes the VGA 70.

Figure 2:
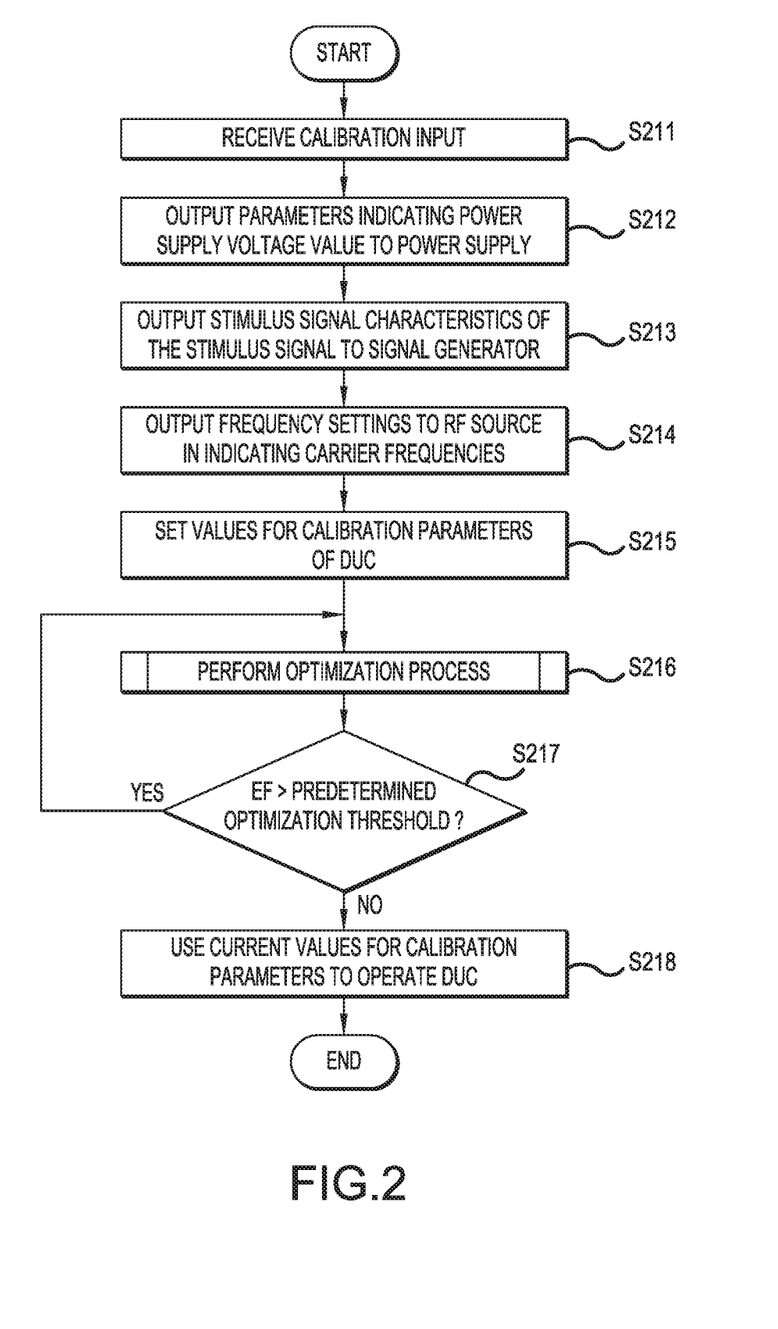
FIG. 2 is a simplified flow diagram of a method for calibrating a DUC, according to a representative embodiment.

FIG. 2 is a simplified flow diagram of a method for calibrating a DUC to optimize performance of the DUC, according to a representative embodiment. The calibration method uses a calibration system, such as the calibration system 100, including a signal generator (110), a baseband gain adjuster (120), a V/I bias generator (130), a signal analyzer (140), a computer (150) and a power supply (160). For example, all or a portion of the steps included in the method illustrated in FIG. 2 may be implemented, at least in part, by a computer processor, processing unit or the like, such as the computer 150 discussed above with reference to FIG. 1. For convenience of explanation, the steps in FIG. 2 will be described with reference to the components identified above in FIG. 1.

Referring to FIG. 2, calibration input is received (e.g., at the computer 150 of the calibration system 100) in block S211. The calibration input may be received from a user, for example, through the user I/F 170. The calibration input includes input data and/or parameters desired by the user, including at least a power supply voltage value, average output power set points and one or more RF carrier frequencies of an output signal of the DUC 10, stimulus signal characteristics of a stimulus signal to be generated by the signal generator 110, DUC specification values, and coefficients for a predetermined EF algorithm for determining the EF of the DUC 10. Various reference voltages and currents may also be provided in block S211.

The power supply voltage value sets the output voltage of the power supply 160, which may be about 3.8 V, for example. The power supply 160 may be referred to as $V_{BATT}$, which is a typical field value of a battery that would be used in typical field operations. The power supply 160 also outputs the power supply current $I_{BATT}$, which is determined by the power supply voltage $V_{BATT}$ and total (not necessarily linear) resistance that the power supply sees (primarily from the ETBM 50).

The average output power set points and the one or more RF carrier frequencies of the output signal of the DUC 10 are selected by the user to provide the desired signal and/or signal characteristics used for the calibration. That is, the user selects multiple average output power set points of the DUC output signal that are representative of a range of output powers expected and/or desired to be provided by the DUC 10. The number and values of the average output power set points are generally within the discretion of the user, depending on the user's objectives, although they may cover at least low-end, high-end and mid-range of the output power range where the ETBM provides improved overall efficiency. The calibration method does not depend on how many sets of input states are used, which may vary to provide unique benefits for any particular situation or to meet application specific design requirements of various implementations, without departing from the scope of the present teachings. The RF carrier frequencies are similarly representative of the communication bands for which the DUC 10 is designed. The RF carrier signals with the chosen carrier frequencies may be generated by the RF source 60 in the DUC 10, as discussed above. The number and values of the RF carrier frequencies are generally within the discretion of the user, depending on the user's objectives. The method for calibrating the DUC 10 includes performing calibration steps for each of the multiple average output power set points at all of the one or more RF carrier frequencies. So, for example, if the computer 150 receives six average output power set points and three RF carrier frequencies, the calibration process addresses each of the six average output power set points at the three RF carrier frequencies (i.e., 18 cases/combinations), and produces an overall optimum (that involves some compromise, as a practical matter).

The calibration method does not depend on how many sets of input states are used, which may vary to provide unique benefits for any particular situation or to meet application specific design requirements of various implementations, without departing from the scope of the present teachings. Technically, each time the EF is computed, it may depend upon measurements made on each of a time-sequence of different user-specified DUC input states. Any of the user-chosen inputs may be sequentially changed by direction of the user. For example, the user may choose to sequentially alter the RF carrier frequencies, or alter the average power set point, or alter the baseband data stream in the signal generator 110. Each set of DUC input states will enable a measurement of the performance of the DUC 10. The complete set of measurements and corresponding DUC input states can then be used to compute the EF.

The stimulus signal characteristics of the stimulus signal to be input to the DUC 10 define the type of signal to be generated by the signal generator 110, including modulation type and duty cycle, for example. The DUC specification values include the product specifications ("specs") for the DUC 10. The product specifications may include, for example, maximum ACPR, minimum efficiency, minimum and maximum gain. Some of the product specifications may originate with regulatory agencies, such as the Federal Communications Commission (FCC), which regulates RF carrier frequencies, output powers, permitted uses, ACPR, and the like, for wireless communication devices.

The coefficients for the predetermined EF algorithm for determining the error function of the DUC 10 depend on the particular EF algorithm being used. Again, the EF algorithm implemented may be within the user's discretion. For purposes of illustration, the predetermined EF algorithm may be Equation (1), although it is understood that other predetermined EF algorithms may be incorporated without departing from the scope of the present teachings:

$$EF = \frac{\Sigma_i w_i * RE_i^2}{\Sigma_i w_i}, RE_i = 0 \text{ if spec is met, else} \frac{x_{i,meas} - x_{i,spec}}{SE_i} \quad (1)$$

Referring to illustrative Equation (1), RE is relative error, $x_{i,meas}$ are measured parameters of the DUC output signal, and $x_{i,spec}$ are the spec values, discussed below in more detail. Index i refers to a parameter in the collection of parameters being specified with min/max values. The coefficients for the predetermined EF algorithm that would be received at block S211 are significant error normalizing denominators ($SE_i$) (characterizing what a user would consider a significant deviation in the parameter value: for example, about 2% for PAE, and about 2 dB for ACPR) and weight factors ($W_i$) (quantifying how much the user wants to emphasize passing the spec for the i:th parameter). Notably, $RE_i=0$ when the particular specification designated by $x_{i,spec}$ is met. Typically, the $x_{i,spec}$ values are modified, over what FCC and/or customers require, in order to provide margin. Therefore, EF typically never reaches to zero (since $RE_i$ will not equal 0 until the spec is met), but will reach a true meaningful optimum (minimum) value. What determines that optimum value is when EF no longer changes, i.e., a zero-gradient minimum has been reached. The EF algorithm may be stored in a memory (e.g., volatile and/or nonvolatile memory) within or otherwise accessible by the computer 150, as described above.

Once the calibration input is received (e.g., input by the user), various information or parameters are output, e.g., by the computer 150, to components of the calibration system 100. For example, in block S212, parameters indicating the power supply voltage value are output to the power supply 160, so that the power supply provides the desired voltage value (e.g., $V_{BATT}$).

Figure 4:
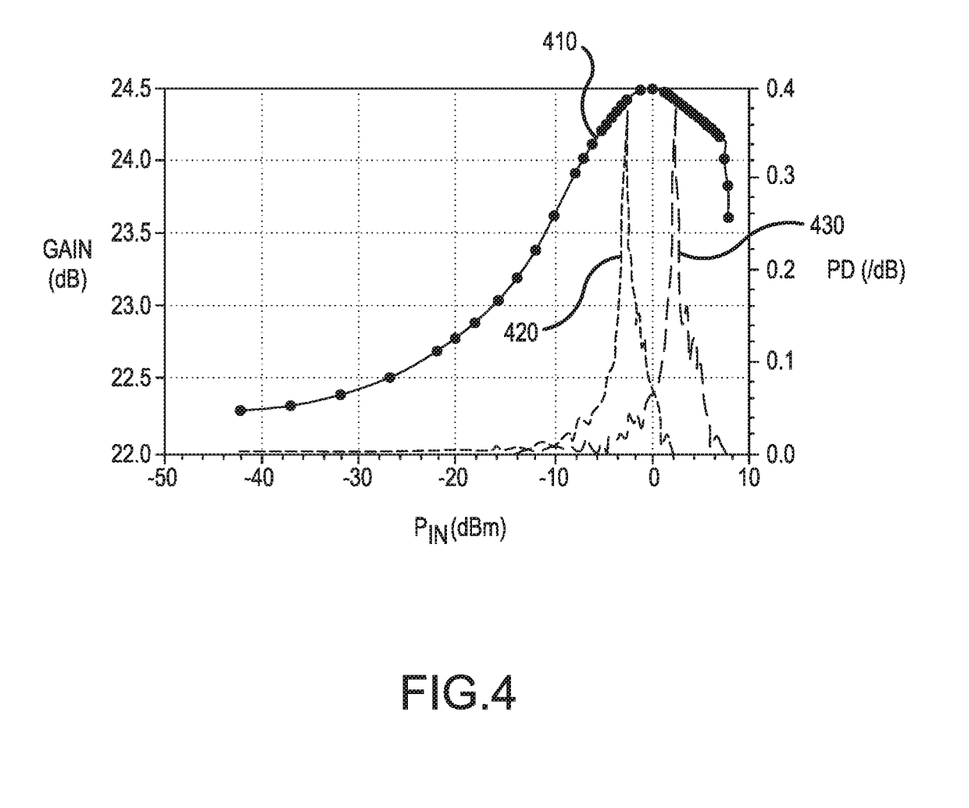
FIG. 4 is a graph that depicts one-dimensional gain curve and power distribution functions (PDFs) for an optimized ETPA circuit, according to a representative embodiment.

In block S213, information indicating the stimulus signal characteristics is output to the signal generator 110. The stimulus signal characteristics may include modulation type (e.g., QAM or QPSK) and a duty cycle of the stimulus signal generated by the signal generator 110. As discussed above, the stimulus signal may be amplified by the baseband gain adjuster 120 and upconverted (e.g., following predistortion and delay) by the quadrature modulator 40 to RF frequencies around the RF carrier frequency. In an embodiment, the signal characteristics provided from the computer 150 to the signal generator 110 may be selected from among a previously determined (and saved) collection of available stimulus signals. Whatever stimulus signal is selected will come with certain predetermined characteristics, like maximum peak-to-average power ratio (PAPR) of about 5.5 dB, for example, as shown in FIG. 4, and various humps/shoulders in the power distribution function. Also, in an embodiment, duty cycle, i.e., the fraction of the time the stimulus signal is ON in any time period, may be selected independently of the type of stimulus signal selected. As noted above, up to the quadrature modulator 40, the stimulus signal is a baseband quadrature signal I/Q or I'/Q', which is low-frequency (e.g., in a range of typically less than about 40 MHz). QAM and QPSK, for example, refer to the type of I/Q or I'/Q' baseband signal being used. The quadrature modulator 40 upconverts the baseband signal, e.g., which has been predistorted by the DPD circuit 20 and delayed by the adjustable delay circuit 30 (and possibly amplified by the baseband gain adjuster 120), to RF frequencies around the RF carrier frequency.

Notably, the stimulus signal characteristics at the input of the PA 15 are within a normal operating range of the DUC 10 to avoid damaging the DUC 10 due to stress otherwise caused by stimulus signal characteristics outside the normal operating range and/or not representative of operational requirements of the DUC 10, which is the case in methods implemented by conventional calibration systems, as discussed above. In other words, the highest powers of the stimulus signal (such as approximately 8 dBm at the input of the PA shown in the graph of FIG. 4) properly take part in the calibration process, but such high powers occur infrequently, which is representative of normal operation, and thus do not do damage that may result from conventional calibration methods (e.g., applying a high-power CW signal over extended periods of time at or near such maximum powers, or in other words, outside the normal operating range). Also, even if calibration methods do not result in damage to the DUC, conventional calibration methods will still produce non-optimum calibration coefficients (unlike the embodiments of the present disclosure) due to excessive heating of the DUC during the calibration process.

In block S214, frequency settings are output to the RF source 60 indicating the one or more RF carrier frequencies of the carrier signals to the DUC 10. The RF carrier frequencies have been input or otherwise defined by the user, as discussed above with reference to block S211. The RF carrier frequencies stay fixed (and thus non-optimized) throughout the calibration process.

Values for calibration parameters of the DUC 10 are set in block S215. These are initial-estimate values for the parameters that will be optimized during the calibration process. The values for the calibration parameters may be set using at least one of user inputs, analytical estimates, machine generated estimates, and previously stored calibration parameters. The analytical estimates and the machine generated estimates may be calculated, at least in part, by the computer 150, for example. The calibration parameters include at least bias parameters, envelope tracker shaping function (SF) coefficients, digital pre-distortion (DPD) coefficients and delay parameters. In an embodiment, the computer 150 provides the envelope tracker SF coefficients to the ETBM 50, the DPD coefficients to the DPD circuit 20 and the delay parameters to the adjustable delay circuit 30. The calibration parameters may be determined by any compatible means, without departing from the scope of the present teachings. For example, the shaping function (SF) may be determined by setting Vcc(max) at a value (e.g., about 3.4 to about 4.5V) typically set by system specs; limiting Vcc(min) by the transistor knee voltage (e.g., about 0.1 to about 0.5V). The ACPR spec will typically drive up Vcc(min) during calibration/optimization, so it may be initially set at or near the high end (about 0.5V or more). A curvature coefficient may be used to produce a linear SF, which is a good first estimate. The DPD coefficients may be determined by starting with either zero-valued coefficients (no DPD), or measuring the gain with no DPD and calculating a first estimate based on the gain nonlinearities. This may be done in the design-phase simulation analogue of the calibration procedure for both amplitude and phase. In the proposed measurement-based calibration setup, it can typically only be done for amplitude.

Notably, DPD polynomials for determining the DPD coefficients are Taylor series around an available input RF voltage representative of operation (a voltage that is itself optimized), and not MacLaurin series at zero power. The Taylor series polynomials (and the envelope tracker SF) are limited to reasonable excursions, using optimizable, smooth functional forms. This helps to avoid issues with numerical instability. The smoothness also helps limit additional spectral regrowth, which is kept within specifications by its term in the optimization EF. In block S216, an optimization process performed by inputting the stimulus signal into the DUC 10 having components set at the respective calibration parameters. The optimization process is a multiple loop process in which information from the output signal of the DUC 10, responsive to each of the average output power set points at the RF carrier frequencies, is used to adjust the calibration parameters. Generally, the multiple loops include measuring a first DC bias current ($I_{BATT}$; e.g., using a current meter) and a first output signal of the DUC 10 (e.g., using the signal analyzer 140) in response to the stimulus signal for a first average output power set point at each of the RF carrier frequencies, measuring a second DC bias current and a second output signal of the DUC 10 in response to the stimulus signal for a second average output power set point at each of the RF carrier frequencies, . . . and measuring an nth DC bias current and an nth output signal of the DUC 10 (where n is a positive integer) in response to the stimulus signal for an nth average output power set point at each of the RF carrier frequencies. Upon completion these measurements, the EF of the DUC 10 is determined (e.g., using Equation (1)), the calibration parameters (e.g., bias parameters, envelope tracker SF coefficients, DPD coefficients, and delay parameters) are slightly adjusted in response to the determined EF, and the measurement process is repeated in response to the stimulus signal using the adjusted calibration parameters until the determined EF is within an acceptable optimization threshold.

That is, at block S217, it is determined whether the value of the EF is greater than the predetermined optimization threshold. When the value of the EF is greater than the predetermined optimization threshold (block S217: yes), the values for the calibration parameters of the DUC 10 are simultaneously adjusted, and the optimization process indicated by block S216 is repeated using the adjusted values for the calibration parameters. But, when the value of the EF is less than (or equal to) the predetermined optimization threshold (block S217: no), the current values for the calibration parameters are used for operating the DUC 10, as indicated in block S218.

In another example, the predetermined optimization threshold may be a difference between EF values determined by two consecutive loops, respectively, such that when the difference between the EF values becomes less than a predetermined optimization difference threshold, the EF is within acceptable limits. That is, when the drop in EF values between two consecutive iterations is small enough (as determined by comparison to a predetermined value), the EF is within acceptable limits, or the zero-gradient minimum has effectively been reached, as discussed above. In yet another example, when the change in values of the calibration parameters are collectively smaller than predetermined individual thresholds, then the EF is within acceptable limits.

Figure 3:
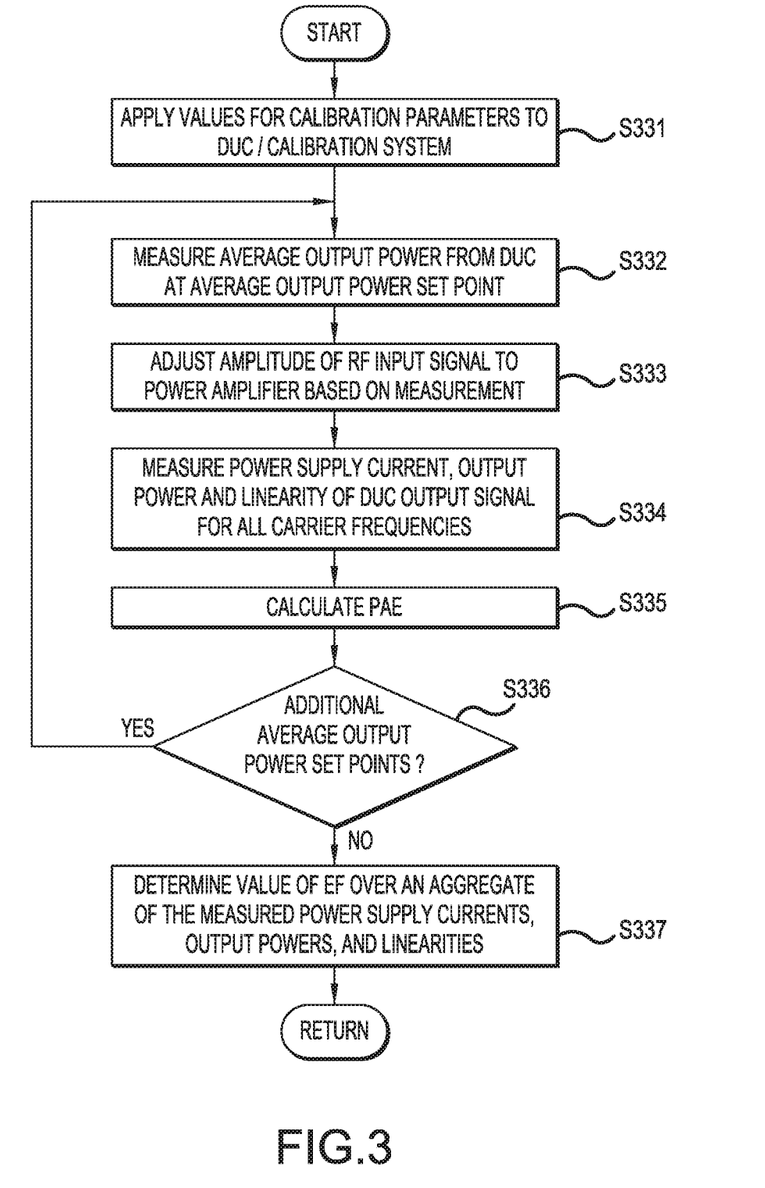
FIG. 3 is a simplified flow diagram of a method for performing an optimization process, in the method for calibrating a DUC, according to a representative embodiment.

FIG. 3 is a simplified flow diagram of a method for performing an optimization process, such as the optimization process indicated by block S216 in FIG. 2, according to a representative embodiment.

Referring to FIG. 3, the optimization process in block S216 begins by applying the values for the calibration parameters to the DUC 10 and/or the calibration system 100 in block S331 for an average output power set point. In block S332, the average output power from the DUC 10 is measured in response to the stimulus signal. An amplitude of the RF input signal to the PA 15 in the DUC 10 is adjusted in block S333 until the measured average output power from the DUC 10 is substantially equal to the average output power set point. Once the measured average output power and the average output power set point are substantially equal, power supply current, output power and linearity of the output signal of the DUC 10 are measured at the average output power set point for each of the RF carrier frequencies (where there is a least one RF carrier frequency) in block S334. Power added efficiency (PAE) of the output signal is calculated in block S335 using the measured power supply current and the measured output power.

In block S336, it is determined whether there are additional average output power set points at the RF carrier frequencies that have been received by the computer 150 (e.g., input by the user). When it is determined that there are no additional average output power set points (block S336: no), meaning that the various measurements have been completed for each of the average output power set points at all the RF carrier frequencies, a value of the EF over an aggregate of the measured power supply currents, output powers and linearities corresponding to the received average output power points is determined in block S337 using the EF algorithm (e.g., Equation (1)), the EF algorithm coefficients and at least one of the aggregated power supply currents, output powers and linearities. The process then returns to block S217 in FIG. 2.

Still referring to the illustrative optimization process of FIG. 3, measuring the average output power of the DUC 10 (e.g., in block S332) may be performed by the signal analyzer 140, and adjusting the amplitude of the RF input signal to the PA 15 until the measured average output power from the DUC 10 is substantially equal to the received average output power set point (e.g., in block S333) may be performed by the VGA 70 inside the DUC 10 or by the baseband gain adjuster 120 in the calibration system 100 outside the DUC 10. In an embodiment, adjusting the amplitude of the RF input signal to the PA 15 in block S333 may include comparing the measured average output power from the DUC 10 with the value of the received average power set point; adjusting the RF input signal to bring the measured average output power closer to the received average power set point, the RF input signal being based on the stimulus signal after quadrature modulation; and repeating the measuring, comparing and adjusting steps until the measured average output power from the DUC 10 is substantially equal to the received average power set point. Alternatively, adjusting the amplitude of the RF input signal to the PA 15 in the simulation version of the embodiment may be done quickly and efficiently by interpolating a power sweep (which may likewise be done in the measurement version, as well). Such a power sweep producing the swept gain may be used for measuring the gain with no DPD and calculating a first estimate based on the gain nonlinearities, discussed above with regard to determining the DPD coefficients.

Once the measured average output power is substantially equal to the received average output power set point, the power supply current is measured by a current meter, and the output power and the linearity of the output signal of the DUC 10 at the average output power set point for the RF carrier frequencies are measured by the signal analyzer 140 (e.g., block S334). The output power and the linearity are indicated in FIG. 1 as output power $P_{OUT}$ and ACPR, respectively (although linearity may be measured by the signal analyzer 140 using other spectral re-growth power ratios, as mentioned above, in which case the measure of linearity would be output by the signal analyzer 140 as those other spectral re-growth power ratios as opposed to ACPR).

As mentioned above, in block S337, the value of the EF over an aggregate of the measured power supply currents, output powers and linearities corresponding to the received average output power points may be determined using the EF algorithm of Equation (1), above.

Referring to Equation (1), the significant error normalizing denominators $SE_i$ in the relative errors $RE_i$ allow meaningful addition of the error terms of very different specified quantities, and are usually decided on once (e.g., about 2% for PAE, and about 2 dB for ACPR). Once the specifications $x_{i,spec}$ are entered (typically with margin), the weights $W_i$ can be used, in a disciplined, quantifiable manner, to tell the calibration system how hard (in a relative sense) to work on meeting the different specs. Notably, the optimization/calibration method described with reference to FIGS. 2 and 3 is set up for all specifications to be addressed simultaneously, thus dealing with the full complexity of the calibration (or design), including full band-widths, phase distortion, tradeoff between efficiency and linearity, and user-selected numbers of bands and signals, for example.

Notably, the square root of EF (sqrt(EF)) may be a rough but useful measure of the quality of the optimization. For example, after optimization, when sqrt(EF) is equal to 0, it means all specs have been met. When sqrt(EF) is approximately 1, then the calibration may be off from meeting the specs by an effective composite significant error (SE). This is a borderline situation that typically can be made acceptable by the spec margins.

In an embodiment, partial derivatives of the EF are calculated (e.g., by the computer 150) with respect to all of the calibration parameters (e.g., the bias parameters, the envelope tracker SF coefficients, the DPD coefficients and the delay parameters) determined during the optimization process. Standard gradient/steepest-descent optimization algorithms may then be used to choose a new set of calibration parameters. In an embodiment, the coefficients $SE_i$ and $W_i$ for the predetermined EF algorithm may remain constant during each optimization/calibration. If after repeating the optimization process, at least one of the EF, the change in EF (AEF) or the change in optimization variables is small enough (e.g., less than a corresponding predetermined value), the calibration process is ended.

Once the DUC 10 has been calibrated, according to embodiments discussed above, it is determined whether additional calibration is needed to cover alternative scenarios, such as calibration for additional communication (frequency) bands, calibration for additional stimulus signals different from the stimulus signals for which the value of the EF has been determined, and/or calibration for different ambient temperatures, for example.

When it is determined that the DUC 10 is to be calibrated for one or more additional communication bands, the steps shown in FIG. 2 are repeated to obtain values for calibration parameters and a value of the EF (or a difference value between consecutive EFs) less than the predetermined optimization threshold for each of the one or more additional communication bands. The values are used for calibration parameters for operating the DUC 10 in each of the one or more additional communication bands, respectively. When it is determined that the DUC 10 is to be calibrated for the one or more additional stimulus signals, the steps shown in FIG. 2 are repeated to obtain values for calibration parameters and a value of the EF (or a difference value between consecutive EFs) less than the predetermined optimization threshold for each of the one or more additional stimulus signals. The values are used for calibration parameters for operating the DUC 10 in each of the one or more additional stimulus signals, respectively. Likewise, when it is determined that the DUC 10 is to be calibrated for one or more different ambient temperatures, the steps shown in FIG. 2 are repeated to obtain values for calibration parameters and a value of the EF (or a difference value between consecutive EFs) less than the predetermined optimization threshold for each of the one or more additional ambient temperatures. The values are used for calibration parameters for operating the DUC 10 in each of the one or more different ambient temperatures, respectively.

The threshold may be the same for the DUC 10 to be calibrated for one or more additional communication bands, additional stimulus signals, or additional ambient temperatures. Gradient-based optimizations typically (or ideally) terminate when the gradient (i.e. the magnitude of the vector made up of the partial derivatives) is zero, or close enough to zero to be acceptable (as expressed by the predetermined optimization threshold). In various embodiments, there may be three thresholds: one for the gradient of the EF, one for the EF itself since (in the EF formalism of Equation (1)) the EF value actually has quantitative meaning, and finally thresholds for the change (or relative change) in the optimization parameters (e.g., potentially one threshold for each optimization parameter).

As mentioned above, using the underlying proven simulation design method, it must be assumed that the delay difference between the ETBM biasing and the RF input signal is the ideal zero. Using the test bench method (and in normal wireless phone operation), the delay difference is more realistically accounted for. That is, the delay difference can not be zeroed out over all varying conditions, but is substantially minimized. Similarly, using the simulation method, memory effects are omitted since memory effects include gain variations that depend in complex and mostly unpredictable ways on the history of the stimulus and operation. Filters with large group delay and the ETBM itself are primary contributors to the memory effects. Conventional test bench methods are sensitive to memory effects, but do not optimally minimize their detrimental effect since those methods use stimuli that are not within normal operating range of the ETPA. Both non-zero delay difference and memory effects can result in significantly higher actual (i.e., measured) ACPR than those predicted by the simulation method.

Regardless, the simulation method generally drives designs in the right direction towards an optimum, and in some respects may be quite accurate. In addition, the simulation method has strengths where the conventional test bench method has weaknesses. In particular, it does a better job representing the thermal conditions an ETPA will likely experience in the field, and also is more computationally (not including the simulation time) efficient by focusing only on power and bias combinations that will actually be used.

The embodiments of the present disclosure involves instruments providing DC and modulated RF stimuli to the ETPA circuit, other instruments to measure and return DC bias currents, output power and ACPR (or other measure of linearity). A computer (150) is programmed to control the flow, the instruments, the biasing, the ETBM delay adjustment, the ET and DPD coefficients, and the data processing. Generally, the data processing includes generating a normalized weighted all-spec EF, its partial derivatives (with respect to the ET and DPD coefficients and the delay), and the parameter adjustments to make in the next optimization iteration. This may be done using the same type of gradient optimizer algorithms available in circuit simulators.

Thus, in general, the embodiments described herein differ from the conventional methods in a number of ways. For example, unlike the conventional test bench method, the present embodiments do not submit the DUC to more extreme conditions than it would experience in normal operation. This reduces unrepresentative catastrophic failures of the DUC during calibration, yield loss, and damage to the DUC showing up in subsequent use (which may result in field returns to the manufacturer). Also, the present embodiments accurately consider the full-specification complexity of the ETPA, and do not make arbitrary assumptions about constant level of compression, isogain, or peak PAE being optimum for overall performance. The present embodiments are properly based on complex voltage gain, as opposed to absolute power gain, and are aligned with (and based on) proven best-practices design optimization approaches for a more optimum product. Also, advantages of the simulation method and the conventional test bench calibration method are combined, while avoiding drawbacks of each. For instance, unlike the simulation method, memory and delay differences are included in the present embodiments, but more realistically than in the conventional test bench method. Also, with a one-dimensional (rather than two-dimensional) data structure, no time or computational effort is spent on powers and voltages not visited in real operation.

FIG. 4 is a graph that depicts one-dimensional gain curve and power distribution functions (PDFs) for an optimized ETPA circuit (from a simulated design optimization), according to a representative embodiment. In the context of FIG. 4, "one-dimensional" refers to the Vcc bias to the PA being dynamically varied as a function of input power as prescribed by the ET Shaping Function. In contrast, conventional "two-dimensional" "waterfall" curves include one curve for each selected constant Vcc.

Referring to FIG. 4, there is only one gain curve (gain curve 410) depicted, where $V_{CC}$ varies along with $P_{IN}$ in an optimized way (e.g., near linear) via the shaping function $V_{CC}=SF(V_{IN})$. This is very different from the multiple gain curves based on two variables ($V_{CC}$ and RF output power) that are generated by the conventional bench test method. Such two-dimensional gain curves are often referred to as "waterfall curves" due to the sharp drop-offs in gains at the corresponding saturated/maximum output power, e.g., of the PA 15, which is approximately $Vcc^2/2/Rload$, where Rload is the real part of the impedance seen from the collector/drain of the large output transistor of the PA 15, towards the output. There is one waterfall curve per $V_{CC}$. With respect to the gain curve 410 in FIG. 4, $V_{IN}$ is the available RF input voltage amplitude related to the available input power $P_{IN}$: $V_{IN}=sqrt(2*R_S*P_{IN})$, where $R_S$ is the impedance of the RF source (e.g., 50 W). $P_{IN}$ is expressed in dBm, where $P_{IN\_dBm}=10*log\ 10(P_{IN}/1\ mW)$.

Further, the illustrative graph in FIG. 4 includes two representative input PDFs, indicated by first PDF curve 420 and second PDF curve 430, superimposed on the gain curve 410, corresponding to two average power set points $P_{OUT}$. Of course, additional average power set points would result in a corresponding number of additional PDF curves. Each (digital modulation) signal, such as LTE, GSM, CDMA, or the like, has its own particular PDF. The output PDF is not just a shifted (by the gain) version of this, but is also distorted by the nonlinearities of the ETPA. So, if the gain vs. $P_{out\_dBm}$ had been plotted as in the waterfall curves discussed above, the first and second PDF curves would have appeared a little different (in particular, they would have been compressed on the high-power side). The baseband gain adjuster (120) adjusts the baseband gain to produce the intended average output power $P_{OUT}$. This is indicated by blocks S332 through S333 in FIG. 3, for example.

In the embodiments of the present disclosure, compared to the design-stage approach, simulation of measurements is replaced with actual measurements, improving upon the results. When all specifications and a full band width are considered, the optimum value of EF does not correspond to isogain or any other first order guesses. Also, the gain only matters where there is RF power (PDF>0). A drop as in FIG. 4 (or an increase) in gain below the lowest average power set point of interest is irrelevant, and asking for the gain to be flat there (as is often done in conventional design and calibration approaches) is a type of over-constraint that may lead to a sub-optimal solution for the calibration factors. In the depicted example, the first PDF curve 420 and second PDF curve 430 are the two extremes, minimum and maximum average $P_{OUT}$ of interest, although additional or alternative PDF curves, corresponding to other average power set points, may be indicated in the same manner, without departing from scope of the present teachings.

Notably, the disclosed embodiments may incur a moderately longer test time than conventional methods, although this moderately longer time is an acceptable tradeoff for the benefits, particularly when the method is used for thorough ET and DPD calibration of a relatively small set of phones. However, the disclosed embodiments may also be used for final DPD calibration of all individual electronic devices (e.g., phones in a manufacturing batch), in which case the DPD coefficients determined by the disclosed embodiments may be used as good initial values requiring minor adjustments. Large-volume calibration, of course, enjoys the same benefits of using realistic non-damaging stimuli.

Also, as mentioned above, the method used for optimizing calibration of a DUC may likewise be used, with some alterations, to optimize design of an electronic device (such as the DUC). For example, a method of optimizing design uses a design system including computer simulations of a signal generator, a baseband gain adjuster, and an ETPA circuit, e.g., the DUC (10). The result of that simulation depends on the Vcc from the ETBM (50), determined by the SF, and the bias currents (or voltages). The dependence on the signal, as well as the gain adjustment, are calculated in an efficient post-simulation numerical analysis.

Generally, the design optimization method may include receiving user input comprising at least average output power set points and one or more RF carrier frequencies of an output signal of the electronic device, stimulus signal characteristics of a signal to be input to the electronic device, specification values, and coefficients for a predetermined EF algorithm for determining an EF of the electronic device, where the stimulus signal characteristics include modulation type and duty cycle, and where the stimulus signal characteristics are within a normal operating range of the electronic device; and setting values for design parameters of the electronic device, the design parameters typically including active device geometries, ballasting resistors, impedance matching component and bias parameters. For envelope tracking and predistortion, the associated coefficients are also included. The design optimization method may further include performing an optimization process; determining whether the value of the EF is less than a predetermined optimization threshold; when the value of the EF is greater than the predetermined optimization threshold, simultaneously adjusting the values for the design parameters of the electronic device, and repeating the optimization process using the adjusted values for the design parameters (which may be done automatically by a standard gradient optimizer); and when the value of the EF is less than the predetermined optimization threshold (or zero gradient is reached), using the values for the design parameters for producing the electronic device. The optimization process includes (i) applying the values for the design parameters to at least one of the electronic device and the design system; (ii) in efficient post-simulation numerical analysis, adjusting the amplitude of the RF input signal until the determined average output power from the electronic device is substantially equal to the received average output power set point; (iii) measuring (i.e., noting/recording numerical simulation output) power supply current and output power and calculating linearity of the output signal of the electronic device at the average output power set point for the at least one frequency; (iv) calculating PAE using the RF input power, the simulated DC power supplied, and the output power (setpoint average power, e.g., averaged using the PDF); (v) repeating steps (ii) through (iv) for each received average output power set point and each of the one or more RF carrier frequencies; and (vi) determining a value of the multi-spec aggregate EF. Since the design optimization method includes internal PA design parameters, the EF may also encompass multiple communication bands and IQ signals for which the product is designed.

The design optimization method differs from the calibration optimization method essentially in that actual measurements are replaced with computer simulations; more specs may be considered (such as PA (15)) input and output return loss, gain, stability, harmonic content in the output of the electronic device, quiescent current, maximum voltages and currents, and the like); ideal time alignment of Vcc and RF amplitude is assumed; memory effects are ignored; the IQ modulation signal, the gain adjustment, and efficiency of an ETBM (50) are provided via calculations in post-simulation numerical analysis; and internal PA design parameters can be included in the optimization.

The various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

What is claimed:

1. A method of calibrating a device under calibration (DUC) using a calibration system for optimizing performance of the DUC, the calibration system comprising a power supply, a signal generator, a baseband gain adjuster, a voltage/current (V/I) bias generator and a signal analyzer, the method comprising:

a) receiving calibration input from a user, the calibration input comprising at least a power supply voltage value (Vbatt), average output power set points and one or more RF carrier frequencies of an output signal of the DUC, stimulus signal characteristics of a stimulus signal to be input to the DUC, DUC specification values, and coefficients for a predetermined error function (EF) algorithm for determining an error function (EF) of the DUC;

b) outputting the power supply voltage value to the power supply;

c) outputting the stimulus signal characteristics to the signal generator, the stimulus signal characteristics including modulation type and duty cycle of the stimulus signal output by the signal generator, wherein the stimulus signal characteristics appearing at an input of a power amplifier in the DUC are within a normal operating range of the DUC to avoid damaging the DUC due to stress caused by stimulus signal characteristics outside the normal operating range and otherwise not representative of operational requirements of the DUC;

d) outputting parameters indicating the one or more RF carrier frequencies to the DUC;

e) setting values for calibration parameters of the DUC, the calibration parameters comprising at least bias parameters, envelope tracker shaping function coefficients, digital pre-distortion coefficients and delay parameters;

f) performing an optimization process, comprising:
      i) applying the values for the calibration parameters to at least one of the DUC and the calibration system,
      ii) measuring average output power from the DUC,
      iii) adjusting an amplitude of an RF input signal to the power amplifier in the DUC until the measured average output power from the DUC is substantially equal to a received average output power set point, iv) measuring power supply current, output power and linearity of the output signal of the DUC at the average output power set point for the one or more RF carrier frequencies, v) calculating power added efficiency (PAE) of the output signal using the measured power supply current and the measured output power, vi) repeating steps ii) through v) for each received average output power set point and each of the one or more RF carrier frequencies, and vii) determining a value of the error function (EF) over an aggregate of the measured power supply currents, output powers and linearities corresponding to the received average output power points using the EF algorithm, the EF algorithm coefficients and at least one of the aggregated power supply currents, output powers and linearities, and g) determining whether the value of the EF is less than a predetermined optimization threshold;

h) when the value of the EF is greater than the predetermined optimization threshold, simultaneously adjusting the values for the calibration parameters of the DUC, and repeating the optimization process using the adjusted values for the calibration parameters; and i) when the value of the EF is less than the predetermined optimization threshold, using the values for the calibration parameters for operating the DUC.

2. The method of claim 1, wherein the coefficients for the predetermined EF algorithm include EF weight factors and significant error (SE) normalizing denominators.

3. The method of claim 1, wherein the values for the calibration parameters of the DUC are set using at least one of a user input, an analytical estimate, a machine generated estimate, and a previously stored calibration parameter.

4. The method of claim 1, wherein the power supply current is measured by a current meter, and each of the output power and the linearity of the output signal of the DUC is measured by the signal analyzer.

5. The method of claim 1, wherein the RF input signal to the power amplifier is adjusted using one of a variable gain amplifier (VGA) inside the DUC or the baseband gain adjuster in the calibration system.

6. The method of claim 1, wherein the signal generator generates a digital signal as the stimulus signal, which is converted to an analog signal prior to quadrature modulation.

7. The method of claim 1, wherein values of bias signals are sourced by the V/I bias generator, including signals having values that are determined by the user, and signals having initial values determined by the user and then altered during the method of calibrating the DUC.

8. The method of claim 1, wherein measuring the linearity of the output signal of the DUC comprises measuring spectral re-growth power ratios of the output signal of the DUC.

9. The method of claim 8, wherein measuring the linearity of the output signal of the DUC comprises measuring adjacent channel power ratio (ACPR) of the DUC.

10. The method of claim 1, wherein adjusting the amplitude of the RF input signal to the power amplifier in the DUC comprises:

comparing the measured average output power from the DUC with a value of a received average power set point;

adjusting the RF input signal to bring the measured average output power closer to the received average power set point, the RF input signal being based on the stimulus signal after quadrature modulation; and repeating the measuring, comparing and adjusting steps until the measured average output power from the DUC is substantially equal to the received average power set point.

11. The method of claim 1, further comprising:

determining whether the DUC is to be calibrated for one or more additional communication bands different from a communication band for which the value of the EF has been determined to be less than the predetermined optimization threshold; and when the DUC is to be calibrated for the one or more additional communication bands, repeating steps a) through h) to obtain values for calibration parameters and a value of the EF less than the predetermined optimization threshold for each of the one or more additional communication bands, and using the values for calibration parameters for operating the DUC in each of the one or more additional communication bands, respectively.

12. The method of claim 1, further comprising:

determining whether the DUC is to be calibrated for one or more additional stimulus signals different from the stimulus signal for which the value of the EF has been determined to be less than the predetermined optimization threshold; and when the DUC is to be calibrated for the one or more additional stimulus signals, repeating steps a) through h) to obtain values for calibration parameters and a value of the EF less than the predetermined optimization threshold for each of the one or more additional stimulus signals, and using the values for calibration parameters for operating the DUC in response to each of the one or more additional stimulus signals, respectively.

13. The method of claim 1, further comprising:

determining whether the DUC is to be calibrated for one or more additional ambient temperatures different from an ambient temperature for which the value of the EF has been determined to be less than the predetermined optimization threshold; and when the DUC is to be calibrated for the one or more additional ambient temperatures, repeating steps a) through h) to obtain values for calibration parameters and a value of the EF less than the predetermined optimization threshold for each of the one or more additional ambient temperatures, and using the values for calibration parameters for operating the DUC at each of the one or more additional ambient temperatures, respectively.

14. A method of calibrating a device under calibration (DUC) using a calibration system for optimizing performance of the DUC, the calibration system comprising a power supply, a signal generator, a baseband gain adjuster, a voltage/current (V/I) bias generator and a signal analyzer, the method comprising:

receiving stimulus signal characteristics of a stimulus signal to be generated by the signal generator and provided to the DUC, the stimulus signal characteristics including modulation type and duty cycle of the stimulus signal, wherein the stimulus signal characteristics appearing at an input of a power amplifier in the DUC are within a normal operating range of the DUC to avoid damaging the DUC due to stress caused by stimulus signal characteristics outside the normal operating range and otherwise not representative of operational requirements of the DUC;

receiving average output power set points and at least one RF carrier frequency of an output signal of the DUC, the output signal being responsive to the stimulus signal;

outputting the stimulus signal characteristics to the signal generator for generating the stimulus signal according to the stimulus signal characteristics;

iteratively performing an optimization process, using calibration parameters of the DUC that are simultaneously adjusted between consecutive iterations of the optimization process, to determine corresponding error function values based on measured power supply currents, output powers and/or linearities of the output signal of the DUC for the consecutive iterations, respectively, until a difference between consecutive determined error function values reaches a specified minimum; and using values of the calibration parameters corresponding to a last iteration of the optimization process for operating the DUC.

15. The method of claim 14, wherein the calibration parameters include at least bias parameters, envelope tracker shaping function parameters, digital pre-distortion parameters and delay parameters.

16. The method of claim 14, wherein the difference between consecutively determined error function values is determined by calculating partial derivatives of the consecutively determined error function values with respect to the corresponding calibration parameters.

17. The method of claim 14, further comprising:

determining whether the DUC is to be calibrated for one or more additional communication bands different from a communication band for which the difference between consecutive determined error function values has reached the specified minimum; and when the DUC is to be calibrated for the one or more additional communication bands, repeating the method until a difference between consecutive determined error function values reaches another specified minimum for each of the one or more additional communication bands, respectively.

18. The method of claim 14, further comprising:

determining whether the DUC is to be calibrated for one or more additional stimulus signals different from the stimulus signal for which the difference between consecutive determined error function values has reached the specified minimum; and when the DUC is to be calibrated for the one or more additional stimulus signals, repeating the method until a difference between consecutive determined error function values reaches another specified minimum for each of the one or more additional stimulus signals, respectively.

19. The method of claim 14, further comprising:

determining whether the DUC is to be calibrated for one or more additional ambient temperatures different from an ambient temperature for which the difference between consecutive determined error function values has reached the specified minimum; and when the DUC is to be calibrated for the one or more additional ambient temperatures, repeating the method until a difference between consecutive determined error function values reaches another specified minimum for each of the one or more additional ambient temperatures, respectively.

* * * * *